United States Patent

[11] 3,585,271

[72] Inventors Edward Henry Reynolds
 Dulwich;
 Philip Robert Hartshorn, Watford, both of, England
[21] Appl. No. 840,961
[22] Filed July 11, 1969
[45] Patented June 15, 1971
[73] Assignee British Insulated Callender's Cables Limited
 London, England
[32] Priority July 17, 1968, July 17, 1968
[33] Great Britain
[31] 34004/68 and 34005/68

[54] GAS INSULATED BUS BAR INSTALLATIONS
 10 Claims, 4 Drawing Figs.
[52] U.S. Cl. ................................................. 174/15,
 174/16, 174/21, 174/28
[51] Int. Cl. ................................................. H01b 9/06
[50] Field of Search ........................................... 174/15 C,
 16, 16 B, 70 B, 71 B, 71 C, 72 B, 75.2, 88 B, 99 B,
 28, 29, 73, 87

[56] References Cited
UNITED STATES PATENTS
2,306,850 12/1942 Usselman ..................... 174/15

| 2,678,428 | 5/1954 | Fiet ........................... | 174/28 |
| 2,992,290 | 7/1961 | Swerdlow ..................... | 174/16 (B) |
| 3,125,199 | 3/1964 | Thompson ..................... | 174/28 X |
| 3,236,933 | 2/1966 | Frowein ..................... | 174/72 X |
| 3,361,870 | 1/1968 | Whitehead ..................... | 174/99 (B) |
| 3,391,243 | 7/1968 | Whitehead ..................... | 174/28 |
| 3,448,202 | 6/1969 | Whitehead ..................... | 174/28 |

Primary Examiner—Lewis H. Myers
Assistant Examiner—A. T. Grimley
Attorney—Webb, Burden, Robinson and Webb ABSTRACT: A high voltage heavy current bus bar installation incorporates a tubular load-carrying conductor supported within a tubular outer enclosure to define an annular dielectric space which is filled with gas under high pressure. Gas is circulated at high pressure through the conductor and through an external heat exchanger independently of the means pressurizing the dielectric. A joint for adjacent sections of the installation provides for angular adjustment and includes mating connecting members sealed to the outer enclosures of the respective lengths and sealed to one another in a plane making an acute angle (preferably 45°) with the axis of each of the lengths. The conductors may be sealed together in a similar manner.

Inventors
Edward Henry Reynolds
Philip Robert Hartshorn
By
Webb, Burden, Robinson & Webb

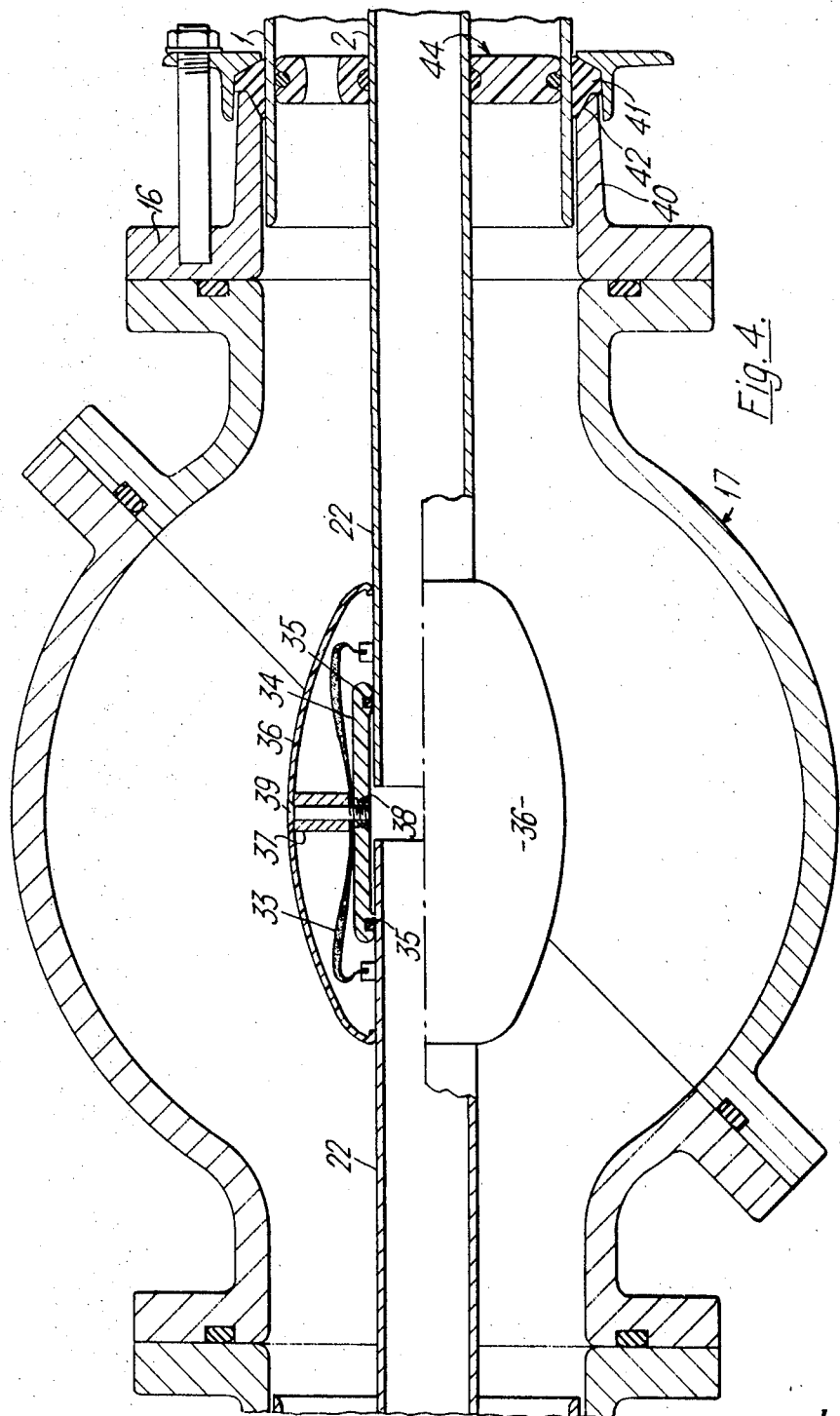

GAS INSULATED BUS BAR INSTALLATIONS

This invention relates to a gas insulated bus bar installation for transmitting electric power at high voltages and heavy currents, that is to say at voltages of 22 kv. and above and currents of 1,000 amps and above. More particularly it relates to an installation of this kind incorporating a bus bar or bus bars each comprising a tubular load-carrying conductor mounted coaxially within a tubular outer enclosure and spaced therefrom by a dielectric consisting principally of an insulating gas under high pressure, i.e. greater than 10 times atmospheric pressure, the remainder of the dielectric consisting of an insulating support or supports spacing the conductor from the enclosure. THe conductor may be supported by a series of spaced supports or by one or more longitudinally extending supports, e.g. a number of plane radial fins, a single helical insulating spacer.

In accordance with the present invention the tubular load carrying conductor is filled with an insulating gas at high pressure, which gas may be the same as or different from the gas filling the annular space between the conductor and the outer enclosure, and means are provided for circulating the gas through the conductor and through an external heat exchanger or exchangers, said means being independent from means provided for maintaining the gas filling the annular space at the required pressure. The latter means may also be capable of circulating the gas under pressure up to MN/$m^2$ (250 lbs./sq.in.) or higher, (depending on the type of gas), through the annular dielectric space and through an external heat exchanger but provision for circulating the gas in the annular space longitudinally through the installation is optional.

The load-carrying conductor and the outer enclosure preferably each consist of metal tubes of circular cross section. The outer tube will normally be of uniform wall thickness but the inner tube may be formed on its inner surface with ribs, fins or other protuberances to assist heat transfer from the metal to the gas. The inner tube is preferably of copper or a high conductivity copper alloy or of another high conductivity metal or alloy but the outer tube may be of steel or aluminum with its external surface suitably protected against corrosion by jackets or coverings of plastics material.

The gases used within the conductor and the annular space are preferably the same but may be different. The gas in the annular space should be an electronegative gas for example sulfur hexafluoride or one of the halogenated organic gases sold under the Trade Mark "Freon," but that within the conductor may alternatively be hydrogen, carbon dioxide or any other gas which is inert to the materials used in contact with it and has a sufficient thermal capacity. The minimum gas pressure both in the conductor and in the annular space is preferably about 1.4 MN/$m^2$ (200 lbs./sq.in.).

The invention also provides a gastight joint between adjacent lengths of the installation, which joint is readily adjustable to enable the two lengths of the structure to be aligned with respect to each other at any angle equal to 90° or less.

The joint in accordance with the invention comprises essentially two mating connecting members, one sealed to the end of each of the lengths of tubular outer enclosure to be connected at the joint and each formed with a circular connecting rim lying in a plane making an acute angle (preferably substantially at 45°) with the axis of the tubular enclosure to which it is sealed, and means for electrically connecting and sealing the conductors of the two lengths together within the chamber formed by sealing the rims of the two connecting members together. The connecting members are preferably so shaped that the chamber is substantially spherical with the connecting rim lying in a diametric plane.

The means for connecting load-carrying inner conductors together preferably comprises two similarly shaped but smaller connecting members, adapted to be supported within the larger connecting members with their outer surfaces substantially uniformly spaced from the inner surfaces of the larger connecting members, but alternative forms of connection providing a sealed gas passage from one conductor to the other and adequate electrical conductivity can be used. A preferred feature of the inner connecting means used is that it should provide the same freedom of adjustment of the angle between the two lengths of bus bar as the connecting member for the outer tubular enclosure, i.e. from 0° to 90° (measured as the angle of deviation from a straight line) when the connecting rims each lie in a plane making an angle of 45° with the axis of the associated length of bus bar, without the use of different connecting parts for each angle or range of angles.

The invention will be further illustrated by a description by way of example of a rigid bus bar installation and of two forms of joint in accordance with the invention. Reference will be made to the accompanying drawings in which:

FIG. 4 shows an alternative form of joint.

Figure 2:
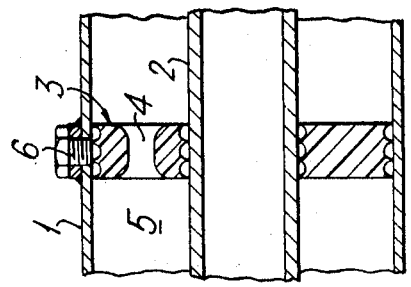
FIG. 2 is a detail drawing showing a portion of the installation of FIG. 1.
Figure 1:
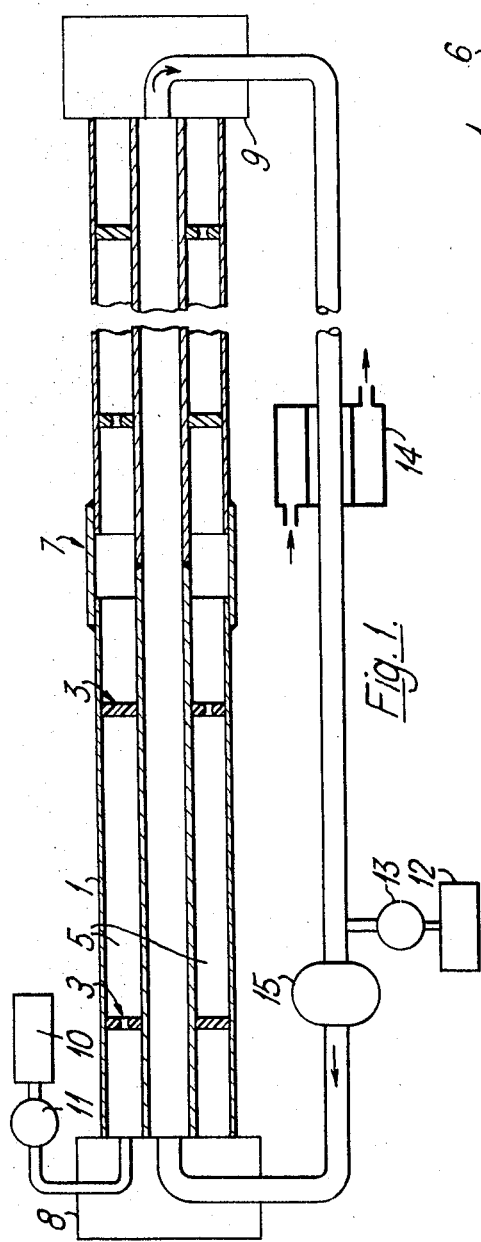
FIG. 1 is a diagram of a simple installation indicating the gas supply and circulation arrangements.

Referring now to FIGS. 1 and 2, each length of the bus bar installation comprises a rigid metal outer tubular enclosure of steel and an inner load-carrying conductor in the form of a rigid tube of copper or copper alloy supported coaxially within the outer tube by insulating spacers 3 arranged at longitudinally spaced intervals. The supporting insulators are preferably each in the form of a disc of insulating material of high dielectric strength, as shown in FIG. 2, with apertures 4 for introduction and if desired circulation of compressed gas filling the annular space 5. Alternatively each spacer may consist of a ring of insulating material mounted on the inner conductor and from which three or more insulating columns project radially at equally spaced intervals to make contact with the inner surface of the outer tube. To ensure that the correct position of such discrete spacers is maintained in spite of the severe expansion cycles which occur in heavy current bus bar systems, the spacers are preferably positively located with respect to either the load-carrying conductor or the enclosure, in most cases preferably the enclosure. This can be effected by means of studs 6 (FIG. 2), preferably three in number, sealed in the enclosure and shaped to engage the spacer.

The installation serves to transmit power from a generator 8 (FIG. 1) to transforming or consuming apparatus 9. Insulating gas is supplied to the dielectric space 5 from a reservoir 10 and is maintained under a suitable pressure by a high-pressure pump 11. The conductor 2 is also filled with gas taken from a reservoir 12 and maintained under pressure by a high-pressure pump 13. Alternatively, a single reservoir and possibly a single high-pressure pump may supply all the compressed gas. The compressed gas filling the conductor 2 is circulated through it and is cooled by passage through an external heat exchanger 14 by a fan or other pump 15, which is independent of the high-pressure pump or pumps 11, 13 and is required to produce only a small pressure differential.

For long straight runs both the inner and outer conductor may consist of lengths of tubing welded together at their ends to form a straight joint, as indicated at 7 in FIG. 1.

Figure 3:
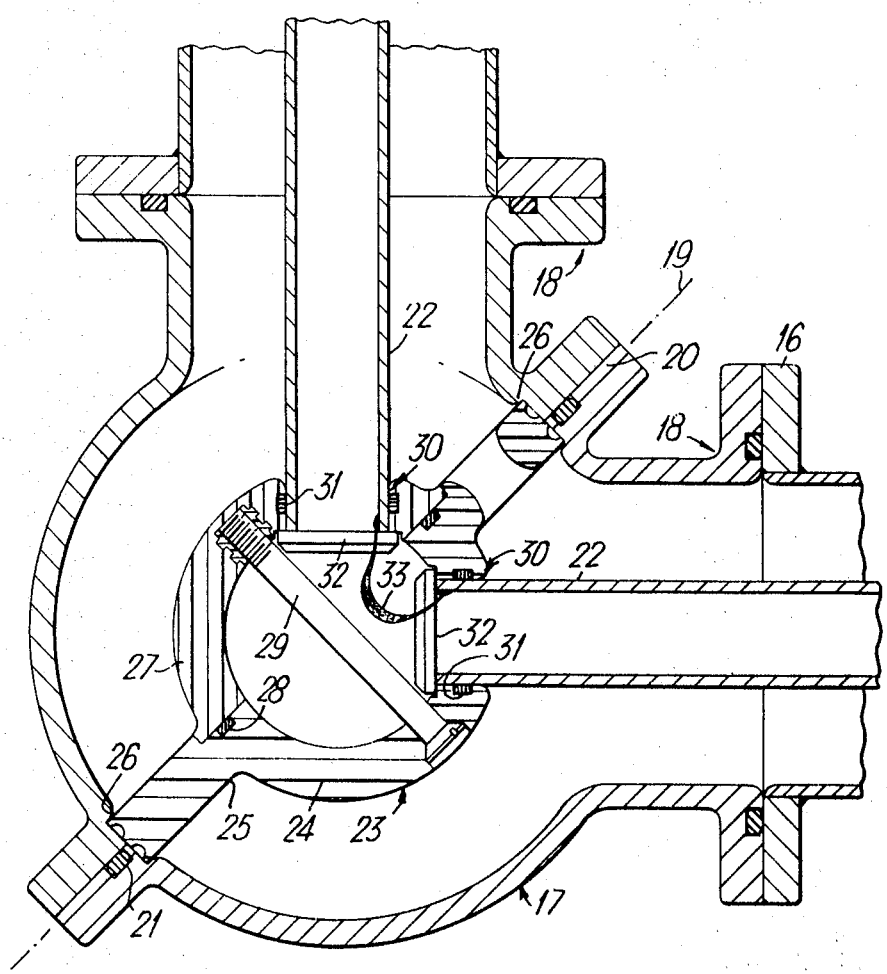
FIG. 3 shows a preferred form of joint for a more complex installation.

Referring now to FIG. 3, at positions where a change in direction of the bus bar route takes place, the end of the enclosure 1 is provided with a flange 16 and the conductor 2 projects from the flanged end of the outer tube, for a reason and to an extent that will hereinafter be described. The flanged ends of the outer enclosures of the two adjacent lengths of the installation connected at the joint are interconnected by a spherical steel chamber 17 of a diameter approximately twice that of the diameter of the outer tube and provided with tubular flanged projections 18 to which the flanged ends of two outer tubes are bolted to make a gastight joint of good electrical conductivity.

The chamber is divided into two parts in a diametric plane 19 making an angle of 45° with the axes of each of the two lengths of bus bar (whatever angle—up to 90°—their axes make with each other) and the two parts of the chamber are connected together by a bolted flanged joint 20 sealed by an O-ring seal 21. The number of bolt holes (not shown) equally spaced around the flanged joint for attaching the flanges of the two parts of the chamber together determines the extent of each adjustment of the angles between the axes of the two bus bars that can be obtained step-by-step by relative rotation between the two halves of the spherical chamber with respect to the common plane of the contiguous surfaces of the flanges extending around their circular rims, the total range of adjustment being 90°. Alternatively the bolt holes may be drilled in places appropriate to the particular joint being made.

The projecting ends 22 of the load-carrying conductors of the two lengths of the installation are similarly mechanically connected by a substantially spherical gastight connecting chamber 23 but in this case the walls of the chamber are of insulating material and only one half 24 of the chamber is formed with a flange 25 on its circular rim. This flange is of a diameter slightly greater than the internal diameter of the spherical metal outer chamber and the rim of the flange is located in a circumferential groove 26 in the outer chamber having its median plane in the plane of connection between the two parts of the outer chamber, that is to say half of the groove is formed in the inner edge of the flange of one part of the outer chamber and the other half is formed in the inner edge of the flange of the other part of the outer chamber.

The other part 27 of the inner insulating chamber has a flat rim engaging with a circular seating on the flanged part and the parts are sealed together by an O-ring seal 28. They are held together by a single bolt 29 located at right angles to the plane of connection and consequently can be relatively adjusted by rotation about the axis of the bolt.

The ends 22 of the two conductors each pass through and make a tight fit with the wall of an aperture 30 in one of the two halves of the inner chamber and are sealed in these apertures by O-ring seals 31. The ends of the conductor tubes are enlarged to form a head 32 providing an annular shoulder preventing retraction of the conductors from the inner chamber.

Since the inner chamber is of insulating material, separate means are provided for making the necessary electrical connection between the two conductors. This may for instance consist of a number of copper or copper alloy braids 33 welded or riveted to the two conductors and located wholly within the inner chamber.

Heat expansion of the inner conductors under load relative to the outer tube is accommodated by sliding movement of the conductors within the O-ring seals by which they are sealed to the inner chamber and this can take place without allowing leakage of gas from the inner chamber to the outer chamber or vice versa.

In the second form of joint to be described, which is shown in FIG. 4, the outer chamber 17 is identical with that shown in FIG. 3, but instead of using a correspondingly shaped inner chamber, the projecting ends 22 of the conductors are interconnected by a sleeve 34 of flexible insulating material (e.g. nylon, polyethylene or P.T.F.E.) making a gastight sliding O-ring sealed joint as shown at 35 with each conductor. As in the previous example the two conductors are electrically interconnected by a flexible braid or braids 33; these braids pass outside the flexible sleeve and are enclosed in a metallic corona shield 36 supported on struts 37 projecting radially from the middle of the flexible sleeve 34. The struts may for example be metal pins with an inner screw threaded end carried in metal socket inserts 38 in the wall of the flexible sleeve and a headed outer end 39 attached to the corona shield, as by soldering, spacer sleeves being provided on the pins to give additional support to the corona shield. The corona shield may be spherical or, more conveniently, it may as shown by of approximately ellipsoid shape with its major axis lying parallel to the axes of the two conductors when these are colinear. It will be appreciated that adjustment of the angle between the axes of the two lengths of bus bar by relative rotation between the two parts of the outer chamber in their diagonal plane of connection will entail distortion both of the corona shield 36 and of the flexible sleeve 34. Consequently the joint shown in FIG. 4 is, if a straight plastics connecting sleeve is used, only suitable where the angle between the axes of the two lengths of bus bar connected is relatively small, whereas the joint shown in FIG. 3 is suitable for use in situations where this angle may be as great as 90°.

FIG. 4 also shows an arrangement permitting thermal expansion of the enclosure 1 to be absorbed. The end of the outer conductor 1 is inserted as a sliding fit in a socket 40 (which forms a continuation of the outer conductor) and is sealed to it in a pressuretight manner by metallic packing material 41 held under pressure between the flared end 42 of the socket and an annular cap member 43 tightly drawn towards the socket, for example by bolts engaging threaded holes in the flange 16.

It may be preferable for spacers (such as spacer 44) which are located adjacent to an expansion joint of the outer conductor to be positively located with respect to the inner conductor, rather than the outer enclosure.

What we claim as our invention is:

1. A high voltage heavy current bus bar installation incorporating at least one bus bar comprising a tubular outer enclosure and a tubular load-carrying conductor mounted coaxially within the outer enclosure and spaced therefrom by at least one insulating support to define an annular dielectric space, and means for maintaining in the dielectric space an insulating gas under high pressure, in which installation the tubular load-carrying conductor is filled with an insulating gas at high pressure and means are provided for circulating the said gas through the load-carrying conductor and through at least one heat exchanger external to the outer enclosure, said means being independent of means provided for maintaining the gas in the dielectric space under high pressure and including at least one joint between adjacent lengths of the installation which joint comprises two mating connecting members, one sealed to the outer enclosure of each of the adjacent lengths, each formed with a circular connecting rim lying in a plane making an acute angle with the axis of the tubular enclosure to which it is sealed, and means electrically connecting and sealing the conductors of the two lengths together within the chamber formed by sealing together the circular connecting rims of the two connecting members.

2. A high voltage heavy current bus bar installation incorporating at least one bus bar comprising a tubular outer enclosure and a tubular load-carrying conductor mounted coaxially within the outer enclosure and spaced therefrom by at least one insulating support to define an annular dielectric space, and means for maintaining in the dielectric space an insulating gas under high pressure and including at least one joint between adjacent lengths of the installation which joint comrises two mating connecting members, one sealed to the outer enclosure of each of the adjacent lengths, each formed with a circular connecting rim lying in a plane making an acute angle with the axis of the tubular enclosure to which it is sealed, and means electrically connecting and sealing the conductors of the two lengths together within the chamber formed by sealing together the circular connecting rims of the two connecting members.

3. An installation as claimed in claim 2 in which the said means for sealing the conductors of the two lengths together comprises a sleeve of flexible insulating material.

4. An installation as claimed in claim 2 in which each of the said angles is substantially equal to 45°.

5. An installation as claimed in claim 2 in which the means for electrically connecting the conductors of the two lengths together is located inside the means for sealing the conductors together.

6. An installation as claimed in claim 2 in which the means for electrically connecting the conductors of the two lengths together is located outside the means for sealing the conductors together and is enclosed in a corona shield.

7. A high voltage heavy current bus bar installation as claimed in claim 2 in which the two mating connecting members are shaped to form a substantially spherical chamber.

8. An installation as claimed in claim 7 in which the circular connecting rims lie in a diametric plane of the spherical chamber.

9. An installation as claimed in claim 8 in which the said means for sealing the conductors of the two lengths together comprises a substantially spherical chamber formed by sealing together two mating connecting members, one sealed to the conductor of each of the adjacent lengths, each formed with a circular connecting rim lying in a diametric plane making an acute angle with the axis of the conductor to which it is sealed.

10. An installation as claimed in claim 9 in which each of the said angles is substantially equal to 45°.